United States Patent Office 3,531,250
Patented Sept. 29, 1970

3,531,250
PROCESS FOR UTILIZING PHOSPHATE SLUDGE
Arnulf Hinz, Knapsack, near Cologne, Heinz Harnisch, Lovenich, near Cologne, and Hans Werner Ziegler, Knapsack, near Cologne, Germany, assignors to Knapsack Aktiengesellschaft, Knapsack, near Cologne, Germany, a corporation of Germany
No Drawing. Filed June 16, 1966, Ser. No. 557,929
Claims priority, application Germany, July 14, 1965,
K 56,612
Int. Cl. C01b 25/00, 25/02
U.S. Cl. 23—223          14 Claims The manufacture of alkali metal phosphates from phosphoric acid obtained by dressing phosphate ores by means of mineral acids, i.e. from so-called wet phosphoric acid, is known to incur the formation of a sludge which is formed of phosphates of iron, aluminum, calcium, magnesium, etc. and adhering alkali metal phosphate solution. This sludge is more especially obtained on neutralizing the above acid by means of an alkali liquor to a pH-value of about 4 to 10, and it is isolated, e.g. by filtration, from the solution to undergo further processing treatment. However, no commercially attractive process has been described heretofore which enables those sludges, formed to an extent of about 40% by weight of dry substance and to an extent of about 60% by weight of water of adhesion and water of crystallization, the dry substance having a $P_2O_5$-content of about 50% by weight, to be utilized. The sludge is therefore often rejected. The working-up treatment of the sludge e.g. with the object of transforming it into dry powder which can be used, for example, in the manufacture of fertilizers is very difficult to achieve. On being heated, the residue is found to undergo agglutination, which is accompanied by softening and the simultaneous elimination of water, and to fuse into lumps at relatively low temperatures. These are inflated especially by escaping steam to form a mass difficult to handle.

To this end, the sludge is mixed with finely ground phosphate ore and the resulting mixture is used for making shapes for use in the electrothermal production of phosphorus, the sludge, determined as dry substance, being used in a quantitative proportion of less than 15% by weight, referred to the phosphate ore.

The phosphate sludge can be added either direct or, if desired, after having been admixed previously with an additive of the type customarily employed as the binding agent in the manufacture of shapes based on phosphate ore. Those additives include more especially phosphate dust of the type obtained e.g. in the electrofilters of phosphorus furnace plants or of the type obtained on removing dust from phosphate ore grinding means by wet or dry processing treatment. An aqueous suspension prepared from the phosate sludge may also include clay. Preferably, the sludge is transformed by means of water and/or a binder and/or a filler, such as customarily employed for making phosphate shapes, into a suspension having a solid matter content varying between 50 and 20, preferably between 40 and 25% by weight. The suspension so obtained is mixed then with the phosphate ore and the mixture is transformed in conventional manner into shapes. These may first be dried and/or sintered and used then for the electrothermal production of phosphorus.

The sludge used should more especially contain less than 15% by weight solid matter, and the binder and/or filler should be added thereto in proportions sufficient to produce a suspension containing altogether 30 to 40% by weight solid matter.

The phosphate sludge or the suspension is preferably added to the phosphate ore by means of a conventional granulating plate, the sludge being atomized on the rotated granules and phosphate ore and thereby distributed thereon especially uniformly.

When the phosphate shapes are prepared in a manner other than by agglomeration by means of a granulating plate as stated above, e.g. by compression with the aid of a compressing means, the sludge should preferably be added to the phosphate ore in a mixing device placed in front of the compressing means. When the shapes are produced by a sinter process, e.g. in a rotary tubular kiln, the suspension can be added inside the rotary tube itself. The atomization of the suspension onto the phosphate ore again is advantageous.

The use of a phosphate sludge obtained on neutralizing wet phosphoric acid entails the following advantages in the agglomeration and sintering of pulverulent phosphate ore:

(1) The bulk of the $P_2O_5$ contained in the sludge is recovered in the form of elementary phosphorus.
(2) The use of this sludge for sintering purposes results in the shapes necessary for the production of phosphorus having an increased compression strength and resistance to abrasion, which is desirable.
(3) Additional auxiliaries (e.g. clay, phosphate dust, alkali metal phosphates, etc.) may be wholly or partially omitted in agglomerating or sintering crude phosphate.

The sludge can be used in dry form in the event that the water required during the agglomeration of the phosphate ore for use in the production of phosphorus does not permit adding the sludge in the form of an aqueous suspension. To this end, the sludge and finely ground phosphate are made first into preliminary mixture which, determined as dry substance, is formed to an extent of up to 25% by weight of sludge with the balance being phosphate ore. The mixture so made is dried then and the dried mixture, which may be ground, if desired, is mixed with additional phosphate ore with the resultant formation of a final mixture containing altogether less than 15% by weight sludge (dry substance) with the balance being phosphate ore. This final mixture is shaped and used then for the electrothermal production of phosphorus. The drying should preferably be achieved at temperatures between 250 and 500° C., advantageously between 300 and 400° C., in order to avoid undesirable baking.

The following examples illustrate the present invention. Phosphate sludge obtained on neutralizing wet phosphoric acid by means of sodium hydroxide solution was used in all of the examples except Example 7.

Analysis of the most important constituents (after drying at 110° C.):

| Sludge obtained by neutralization with NaOH | | Sludge obtained by neutralization with KOH | |
|---|---|---|---|
| $P_2O_5$, percent | 47–53 | $P_2O_5$, percent | 44 |
| $Na_2O$, percent | 20–26 | $K_2O$, percent | 30.5 |
| CaO, percent | 1.5–4.5 | CaO, percent | 2.6 |
| $Al_2O_3$, percent | 2.0–6.0 | $Al_2O_3$, percent | 3.5 |
| $Fe_2O_3$, percent | 2.0–6.0 | $Fe_2O_3$, percent | 3.3 |

EXAMPLE 1

100 kg. phohphate sludge containing 60% by weight water of adhesion and water of crystallization and 40% by weight dry substance were suspended in 60 kg. water in a stirring vessel with the resultant formation of a readily atomizable suspension containing 25% by weight dry substance. 100 kg. of the suspension so made were used to agglomerate and granulate 350 kg. ground phosphate ore placed on a rotary plate 1 m. wide. The moist granules contained 16.5% by weight water and approximately 8.9% by weight dry substance (phosphate sludge), referred to the phosphate ore; this means that 10 kg. dry substance in the form of a 25% by weight suspension enables 140 kg. ground phosphate ore to be agglomerated.

After having been dried and sintered at about 950° C., the granules were found to have an average compression strength of 75 to 80 kg. and an abrasion resistance of 85 to 90%.

The resistance to abrasion was tested by placing 1000 kg. of sintered pellets in a drum 300 mm. wide and rotating them therein for 30 minutes at a speed of 80 r.p.m. After that treatment, the abrasion fines with a size of less than 0.5 mm. were determined.

EXAMPLE 2

100 kg. phosphate sludge containing 60% by weight water of adhesion and water of crystallization and 40% by weight dry substance were suspended in 34 kg. water in a stirring vessel with the resultant formation of an atomizable suspension containing 30% by weight dry substance. 100 kg. of the suspension so produced enabled 320 kg. of ground phosphate ore to be agglomerated into granulated matter. The granules contained 16.6% by weight water and 9.4% by weight dry substance (phosphate sludge), referred to the phosphate ore. This means that 10 kg. dry substance in the form of a 30% by weight suspension enabled approximately 107 kg. ground phosphate ore to be agglomerated.

After having been dried and sintered, the granulated matter was found to have a compression strength of 80 to 900 kg. and a resistance to abrasion of 90 to 95%.

EXAMPLE 3

100 kg. phosphate sludge containing 60% by weight water of adhesion and water of crystallization and 40% by weight dry substance were suspeneded, in the manner set forth in Example 2, in 34 kg. water in a stirring vessel. The resulting suspension which contained 30% by weight dry substance was admixed with 23 kg. very fine phosphate and a suspension just atomizable and containing altogether 40% by weight solid matter was obtained.

100 kg. of the suspension so made were used to agglomerate approximately 250 kg. ground phosphate ore. The granules contained 17% by weight water and 10.1% by weight dry substance (phosphate sludge, referred to the phosphate ore. This means that 10 kg. dry substance in the form of a 40% by weight suspension, where 30% of the dry substance were phosphate sludge and 10% were very fine phosphate, enabled approximately 100 kg. phosphate ore to be agglomerated.

After having been dried and sintered, the granulated matter was found to have a resistance to compression of 110 to 112 kg. and a resistance to abrasion of 98%. The addition of the very fine phosphate resulted in a tighter structure of the phosphate ore during the agglomeration. This resulted in higher resistance to compression and abrasion after sintering, compared with the results obtained in Examples 1 and 2.

EXAMPLE 4

Suspensions containing 25 to 35% by weight dry substance (in the form of phosphate sludge) were used in the manner set forth in Examples 1 to 3 for agglomerating ground phosphate ore. For every 10 kg. of dry substance, the suspensions enabled 140 to 100 kg. phosphate ore to be agglomerated. In the present example, the phosphate ore was agglomerated by means of a suspension which contained no more than 10% by weight dry substance (in the form of phosphate sludge) but which had been admixed with clay and very fine phosphate.

35 kg. phosphate sludge containing 60% by weight water of adhesion and water of crystallization and 40% by weight dry substance were suspended in 100 kg. water in a stirring vessel with the resultant formation of a suspension containing 10.4% by weight dry substance. The suspension so made was used to suspend 1.5 times the amount=21.0 kg., referred to the dry substance (phosphate sludge), of dry clay (corresponding to 28.0 kg. clay containing 25% by weight water of adhesion).

The resulting suspension then contained 8.6% by weight dry substance (in the form of phosphate sludge) and 12.9% by weight dry clay, or contained altogether 21.5% by weight solid matter. The total content of solid matter was increase to 40% by weight by admixing the said suspension with 51 kg. very fine phosphate. The suspension was found then to contain 6.5% by weight dry substance (in the form of phosphate sludge), 9.8% by weight dry clay, the balance of 23.7% by weight being very fine phosphate.

100 kg. of the suspension so made which contained 15.5% by weight water were used for agglomerating and granulating 280 kg. phosphate ore. The moist granules contained 6.5 kg. dry substance (originating from the phosphate sludge); this means that 10 kg. dry substance (in the form of phosphate sludge) used in combination with 1.5 times the amount of clay and the very fine phosphate addition enabled 430 kg. phosphate ore to be agglomerated.

After having been sintered, the granules were found to have a resistance to compression of 60 kg. and a resistance to abrasion of 90%.

EXAMPLE 5

A suspension containing 10% by weight dry substance (in the form of phosphate sludge) was used to suspend twice the amount of dry clay (in the form of clay containing 25% by weight water of adhesion), referred to the dry substance (in the form of phosphate sludge), and the resulting suspension was admixed with very fine phosphate to increase the total content of solid matter to 40% by weight. The granules prepared by means of this suspension were sintered and found then to have a resistance to compression of 70 kg. and a resistance to abrasion of 94 to 95%.

EXAMPLE 6

100 kg. of ground phosphate ore were homogeneously mixed in a tumbling mixer with 5 kg. dried and ground phosphate sludge, agglomerated then with a customary service suspension, and the granules were sintered. After having been sintered, the granules were found to have a resistance to compression of 100 to 110 kg. and a resistance to abrasion of 90 to 94%.

EXAMPLE 7

Phosphate sludge obtained on neutralizing wet phosphoric acid by means of potassium hydroxide solution was suspended in a manner analogous to that described in Example 2 to obtain a suspension containing 30% by weight dry substance, and the suspension was atomized then for agglomerating phosphate ore. After having been sintered, the granules were found to have a resistance to compression of 83 kg. and a resistance to abrasion of about 90%.

EXAMPLE 8

100 kg. phosphate ore (particle size: 0 to 3 mm., of which 70% had a size of less than 0.5 mm.) were intensely mixed for 2 minutes in an Eirich mixer with 18 kg. of a suspension containing 30% by weight dry substance in the form of phosphate sludge, and compressed then on a grooved roll press. Elongated shapes which on leaving the roll broke into pieces 20 to 60 mm. long were obtained. The moist shapes contained about 9% by weight water and 4.6% by weight dry substance (in the form of phosphate sludge). This means that 10 kg. dry substance (in the form of phosphate sludge) enabled 185 kg. phosphate ore to be compressed.

After having been sintered, the shapes were found to have a resistance to compression of 148 kg. and a resistance to abrasion of 73%.

The resistance to abrasion of those shapes which is lower than that of granules is due to the fracture surfaces appearing on the front side of the shapes.

EXAMPLE 9

100 kg. phosphate ore (particle size: 0 to 3 mm., of which 70% had a size of less than 0.5 mm.) were mixed in an Eirich mixer with 22 kg. of a suspension which contained altogether 40% by weight solid matter, of which 10% by weight were dry substance (in the form of phosphate sludge), 12% by weight were dry clay (in the form of clay containing 25% by weight water), and 18% by weight were very fine phosphate, and compressed then on a grooved roll press. The resulting shapes contained 11.1% by weight water and 1.7% by weight dry substance (originating from phosphate sludge). This means that 10 kg. dry substance (in the form of phosphate sludge) used in combination with clay and very fine phosphate in the suspension, enabled about 450 kg. phosphate ore to be compressed.

After having been sintered, the shapes were found to have a resistance to compression of 118 kg. and a resistance to abrasion of 72%.

EXAMPLE 10

100 kg. phosphate ore and 10 kg. dry phosphate sludge (dried at 500° C.) were mixed in a mixer with 20 kg. of a service granulation suspension and compressed then. After having been sintered, the shapes so made were found to have a resistance to compression of 122 kg. and a resistance to abrasion of 75%.

The phosphate sludge is very difficult to transform into dry powder in continuous operation, e.g. in a rotary tubular kiln. The reasons are that sludge removed e.g. from a filter press firstly can scarcely be bunkered and is very difficult to supply in measured quantities; secondly, on being heated to a temperature e.g. of 300 to 400° C., the sludge undergoes softening which is accompanied by the elimination of water, and it ultimately fuses into lumps that tenaciously adhere to and form crusts on the walls of the kiln. The addition of ground phosphate ore enables all of these difficulties, which are encountered during the treatment in the rotary tubular kiln, to be obviated.

EXAMPLE 11

A rotary tubular kiln 1800 mm. long and 250 mm. wide was continuously fed with ground phosphate ore (particle size: <0.5 mm.) coming from a bunker and travelling over a magnetic groove. Phosphate sludge, which had been suspended in a stirring vessel to give a suspension containing 30% by weight dry substance, was introduced simultaneously into the kiln through a tube having an opening 2 mm. wide, the suspension being supplied in the form of a thin jet flowing in the direction of the intake phosphate ore. The wetting of the phosphate by means of the suspension resulted in the formation of lumps 10 to 400 mm. wide. These were caused slowly to travel through the rotary tubular kiln at a temperature of 350 to 400° C. and were dried thereby. The moist lumps which contained absorbed suspension had a water content of about 30% by weight. After having been dried, they were found to contain about 80% by weight phosphate ore and 20% by weight dry substance (originating from the phosphate sludge). The dry lumps can be added to phosphate ore to be ground for being granulated or compressed.

What is claimed is:

1. A process for utilizing sludge obtained on neutralizing wet phosphoric acid and which consists essentially of phosphates of iron, aluminum, calcium and magnesium and adhering alkali metal phosphate solution which comprises mixing the sludge with fine ground phosphate ore, making phosphate shapes of the resulting mixture, the sludge determined as dry substance being used in a quantitative proportion of less than 15% by weight referred to the phosphate ore and using the phosphate shapes in the electrothermal production of phosphorus.

2. A process as claimed in claim 1, wherein the sludge is transformed by means of at least one member selected from the group consisting of water and of binders and fillers used for making phosphate shapes, into a suspension containing between 50 and 20% by weight solid matter, the suspension so made is then mixed with the phosphate ore, and the resulting mixture is made into shapes for use in the electrothermal production of phosphorus.

3. A process as claimed in claim 2, wherein a sludge containing less than 15% by weight solid matter is first transformed into a suspension and the suspension is then admixed with the said fillers and binders to thereby increase the total content of solid matter of the suspension to a value between 30 and 40% by weight.

4. A process as claimed in claim 2, wherein the binders and fillers are at least one member selected from the group consisting of clay, phosphate dust, very fine phosphate and alkali metal phosphates.

5. A process as claimed in claim 2, wherein the suspension contains between 40 and 25% by weight solid matter.

6. A process as claimed in claim 2, wherein the phosphate shapes are dried.

7. A process as claimed in claim 2, wherein the phosphate shapes are sintered.

8. A process as claimed in claim 1, wherein the sludge and finely ground phosphate ore are made into a preliminary mixture which, determined as dry substance, is formed to an extent of up to 25% by weight of sludge with the balance being phosphate ore, the mixture is then dried, the dried mixture is mixed with additional phosphate ore with the resultant formation of a final mixture containing less than 15% by weight sludge (dry substance) with the balance being phosphate ore, and the said final mixture is used for the electrothermal production of phosphorus.

9. A process as claimed in claim 8, wherein the said preliminary mixture is first dried, then ground and additional phosphate ore is added to the ground mixture.

10. A process as claimed in claim 8, wherein the mixture formed of a sludge and phosphate ore is dried at a temperature between 250 and 500° C.

11. A process as claimed in claim 10, wherein the mixture formed of sludge and phosphate ore is dried at a temperature between 300 and 400° C.

12. A phosphate shape for use in the production of phosphorus consisting essentially of sludge obtained in neutralizing wet phosphoric acid and which consists essentially of phosphates of iron, aluminum, calcium and magnesium and adhering alkali metal phosphate solution, finely ground phosphate ore mixed with said sludge, said sludge determined as dry substance being present in a proportion of less than 15% by weight with reference to said finely ground phosphate ore and said shapes having an average compression strength of about 60–148 kg. and an abrasion resistance of about 72–98%.

13. A phosphate shape as set forth in claim 12, wherein said sludge essentially consists of alkali metal phosphates.

14. A phosphate shape as set forth in claim 12, which also includes binders and fillers, and said binders and fillers include at least one member selected from the group consisting of clay, phosphate dust, very fine phosphate ore and alkali metal phosphates.

References Cited

UNITED STATES PATENTS

| | | | |
|---|---|---|---|
| 1,334,474 | 3/1920 | Waggaman | 23—223 |
| 1,655,981 | 1/1928 | Barr | 252—188.3 |
| 2,039,297 | 5/1936 | Curtis | 23—223 |
| 2,267,077 | 12/1941 | Burke | 23—223 |

LEON D. ROSDOL, Primary Examiner

IRWIN GLUCK, Assistant Examiner

U.S. Cl. X.R.

23—105; 71—33; 252—182